United States Patent [19]

Lange

[11] 4,052,671
[45] Oct. 4, 1977

[54] ADAPTIVE EQUALIZER

[75] Inventor: Julius Lange, Sunnyvale, Calif.

[73] Assignee: Ford Motor Company, Dearborn, Mich.

[21] Appl. No.: 735,231

[22] Filed: Oct. 26, 1976

[51] Int. Cl.² .............................................. H04B 1/10
[52] U.S. Cl. .................................... 325/42; 325/323; 325/324; 333/18
[58] Field of Search ................... 325/42, 30, 320, 323, 325/324; 333/18

[56] References Cited

U.S. PATENT DOCUMENTS

| | | | |
|---|---|---|---|
| 3,375,473 | 3/1968 | Lucky | 333/18 |
| 3,746,989 | 7/1973 | Heim | 325/42 |
| 3,787,762 | 1/1974 | Sato | 325/42 |
| 3,868,576 | 2/1975 | Bagdasarjanz | 325/42 |
| 3,921,072 | 11/1975 | Sato | 325/42 |
| 4,021,738 | 5/1977 | Gitlin | 325/323 |
| Re. 28,638 | 12/1975 | Gibson | 325/42 |

Primary Examiner—Robert L. Griffin
Assistant Examiner—Michael A. Masinick
Attorney, Agent, or Firm—Robert W. Brown; Keith L. Zerschling

[57] ABSTRACT

An adaptive equalizer for improving the quality of digital data contained in an electrical input signal supplied to the equalizer. The equalizer compensates for amplitude and delay distortion affecting the quality of the digital data contained in the electrical input signal. The equalizer includes a delay line having a plurality of discrete time delay elements and in a plurality of taps coupled to the delay elements. A clock circuit provides a plurality of clock signals of identical frequency but different phase, thereby, dividing a pre-selected time interval into a plurality of time-slots. A sequential switch controlled by the clock signals sequentially connects the delay line taps to a quality detector which also has as an input the equalizer output signal. The quality detector generates a signal, during each of the time slots, that represents the quality of the equalizer output signal. The criteria for the equalizer output signal quality is its squareness, and the quality detector output signals are used to control counters which may be incremented or decremented, as required, to improve the equalizer output signal quality. The digital outputs from the counters are supplied to digital-to-analog converters and the resulting analog signals are applied to voltage controlled amplifiers. The signals from the delay line taps are applied to the voltage controlled amplifiers in the equalizer and thereafter are summed to produce the equalizer output signal. The adjustment of the counters either up or down changes the gain of the voltage controlled amplifiers to improve the squareness of the equalizer output signal in a closed-loop manner.

4 Claims, 8 Drawing Figures

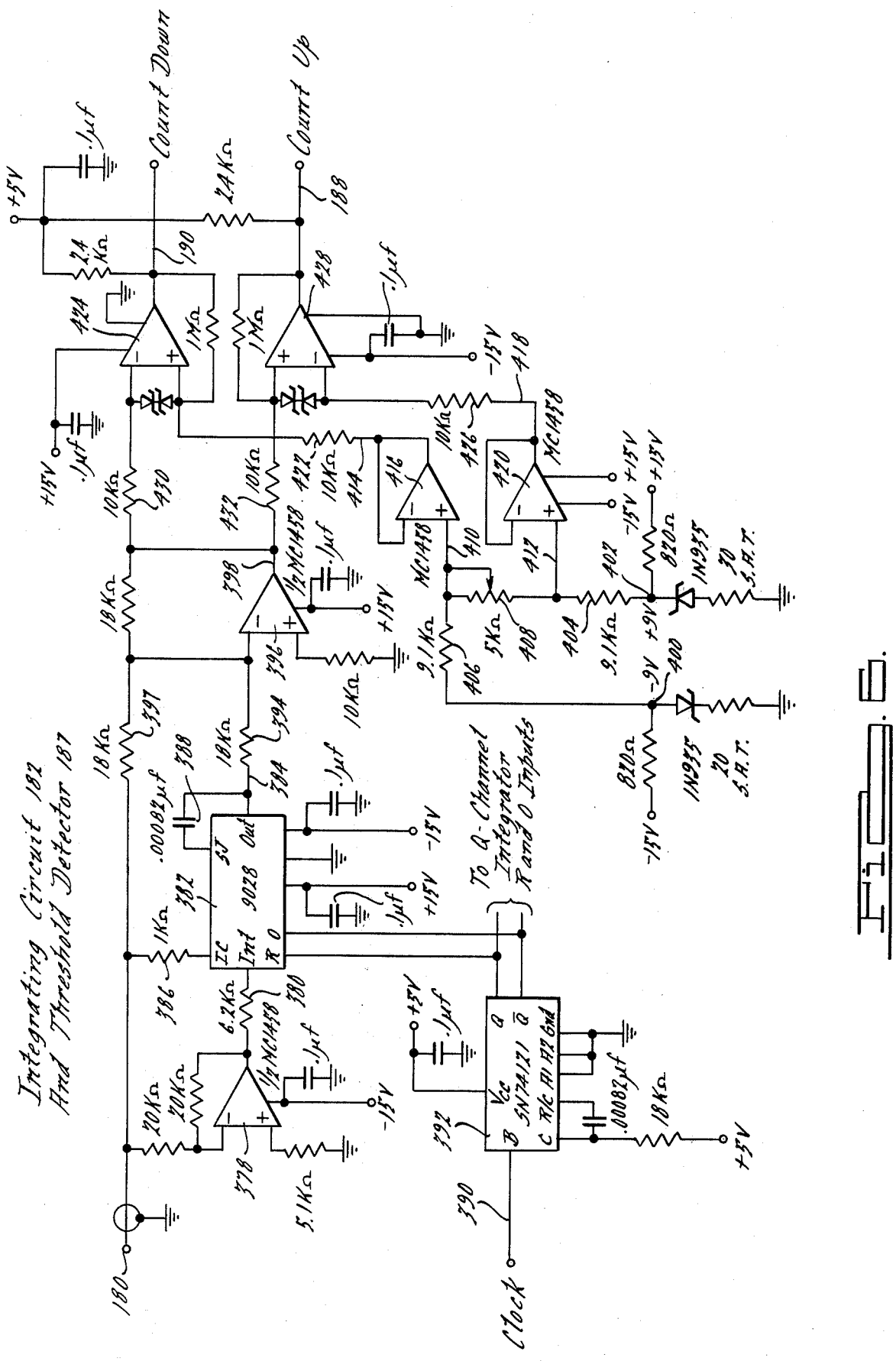

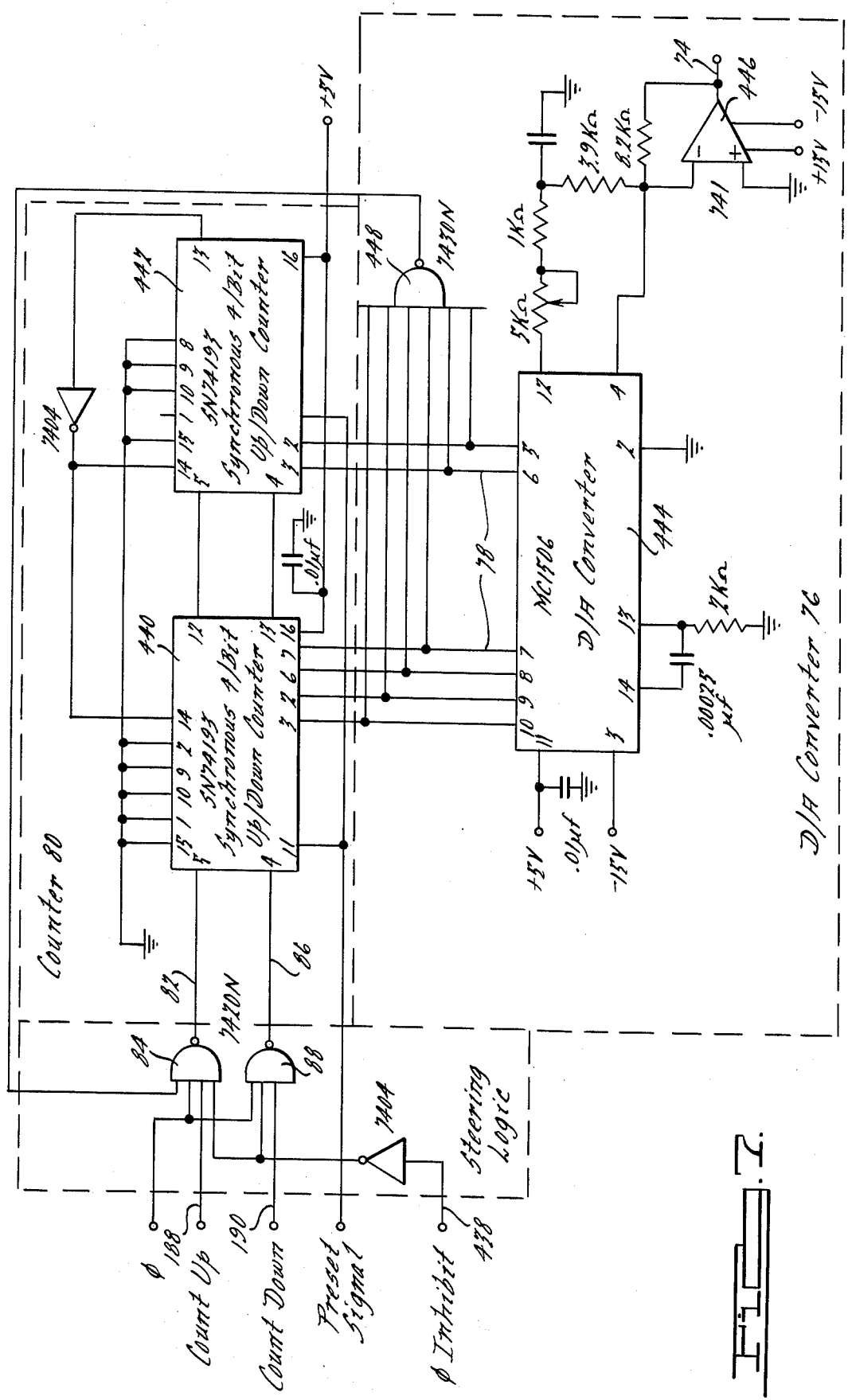

ADAPTIVE EQUALIZER

BACKGROUND OF THE INVENTION

This invention relates to an adaptive equalizer for improving the quality of digital data contained in an electrical input signal supplied to the equalizer. The equalizer compensates for amplitude and delay distortion affecting the quality of the digital data contained in the electrical input signal.

Adaptive or automatic equalizers are known in the prior art and are described in U.S. Pat. Nos. 3,375,473 to Lucky, 3,746,989 to Heim and 3,787,762 to Sato. In the system described in the Lucky patent, test pulses are utilized to arrive at optimum settings of attenuators in an equalizer that is responsive to the digital test pulses. The system described in the Heim patent perturbs the transmission path to permit determination of the best equalizer setting. Heim uses a quality detector that includes a DC level shifter and a half-wave rectifier to provide equalizer adjustments. The Sato patent describes an equalizer for a quadrature-amplitude-modulated signal. Of the systems mentioned above, it is believed that the Heim patent is most pertinent to the present invention. However, the Heim system is limited to frequency-shift-keyed signals and operates in a manner quite different than that described in the present invention.

SUMMARY OF THE INVENTION

In accordance with the present invention, an equalizer is provided for improving the quality of digital data contained in an electrical input signal supplied to the equalizer. The equalizer compensates for amplitude and delay distortion affecting the quality of the digital data contained in the electrical input signal. The equalizer comprises a delay line that is adapted to be supplied with the electrical input signal. The delay line includes a plurality of discrete time delay elements and a plurality of taps coupled to the time delay elements. Means are provided for generating a plurality of electrical clock signal of identical frequency but different phase. These signals are used to provide a plurality of time-slots. Sequential switch means, coupled to the plurality of delay taps, is used sequentially to couple the sequential switch means output to the delay line taps. The time-slot signals are utilized to control the sequential switch means so that a different delay line tap is connected to the sequential switch means output during each of the time-slots. A plurality of voltage controlled amplifiers, which may have voltage gains less than unity to provide attenuation, are provided. Each voltage controlled amplifier (VCA) has an input coupled to one of the delay line taps and an output. Also, each VCA has a control voltage input.

A plurality of binary number counters, one being provided for each of the VCAs, have outputs supplied to digital-to-analog converters, which in turn, have outputs connected to the control-voltage inputs of the VCAs. The gains of the VCAs are functions of the analog voltages produced at the outputs of the D/A converters. The adaptive equalizer output is obtained from a summing circuit, the inputs of which are the outputs of the various VCAs.

A quality detector is supplied with the equalizer output signal and with the delay line tap signals which sequentially appear at the output of the sequential switch means. The quality detector evaluates the squareness of the equalizer output signal and increments or decrements the various counters as required to improve the equalizer output signal quality.

In the preferred embodiment, hereinafter described, an equalizer is provided for improving the quality of two channels of binary digital data that may be obtained from the output of a demodulator of a transmitted quadrature-phase-shift-keyed signal. Two delay lines are utilized each having a plurality of taps whose signals are combined in a manner that compensates for intrasymbol interference within each channel and for cross-talk between channels.

The invention may be better understood by reference to the detailed description which follows and to the drawings.

BRIEF DESCRIPTION OF THE DRAWINGS

FIG. 7 is a schematic electrical diagram of steering logic, a counter and a V/A converter shown in block form in FIG. 1; and FIG. 8 is a schematic electrical diagram of a VCA.

DETAILED DESCRIPTION

Reference is made to the drawings wherein like numerals refer to like items in the several views and wherein values and type numbers for various components are given by way of example and not limitation.

Figure 1:
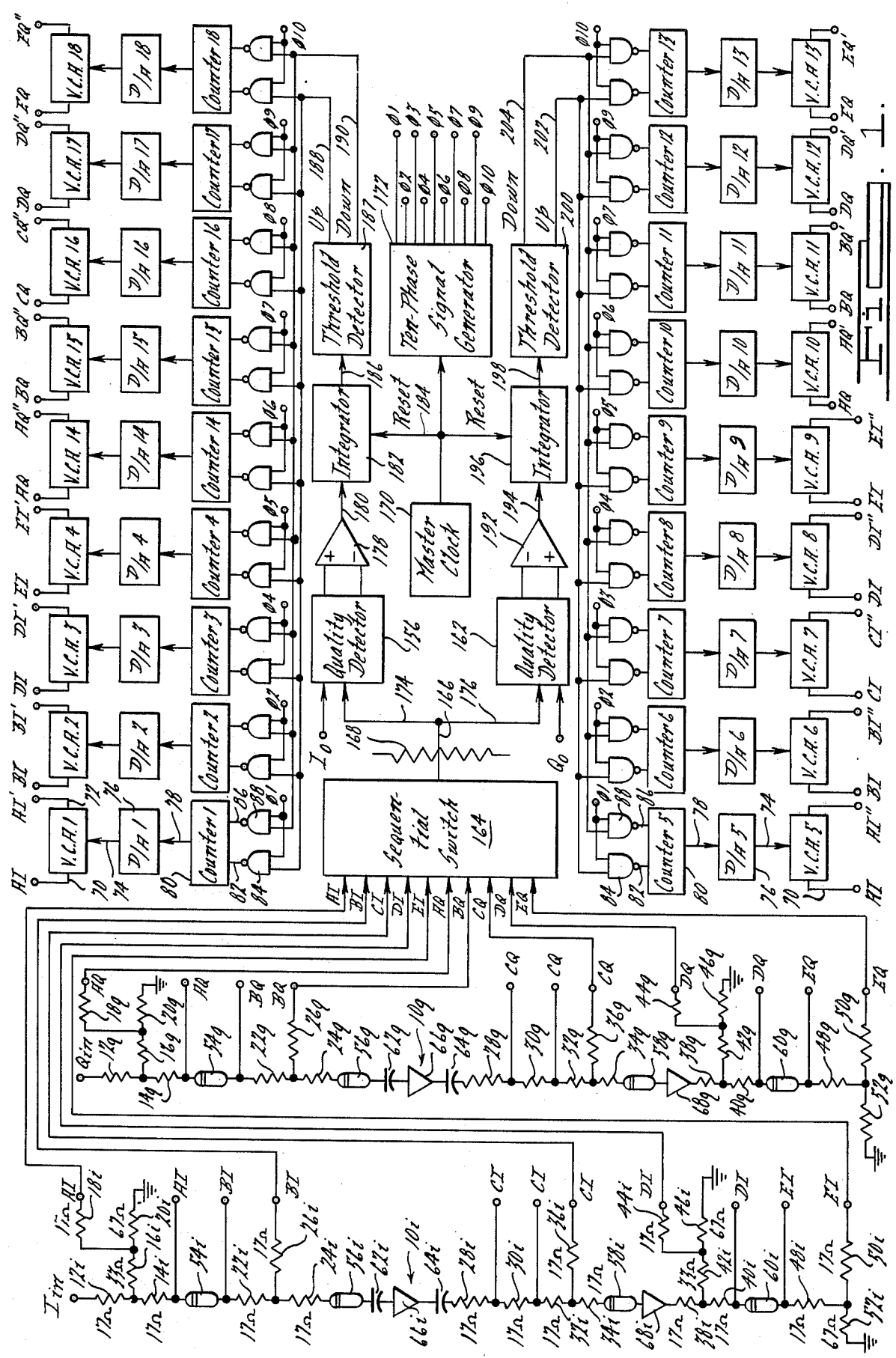
FIG. 1 and 2 together constitute a block diagram of an adaptive equalizer for two channels of binary digital data.
Figure 2:
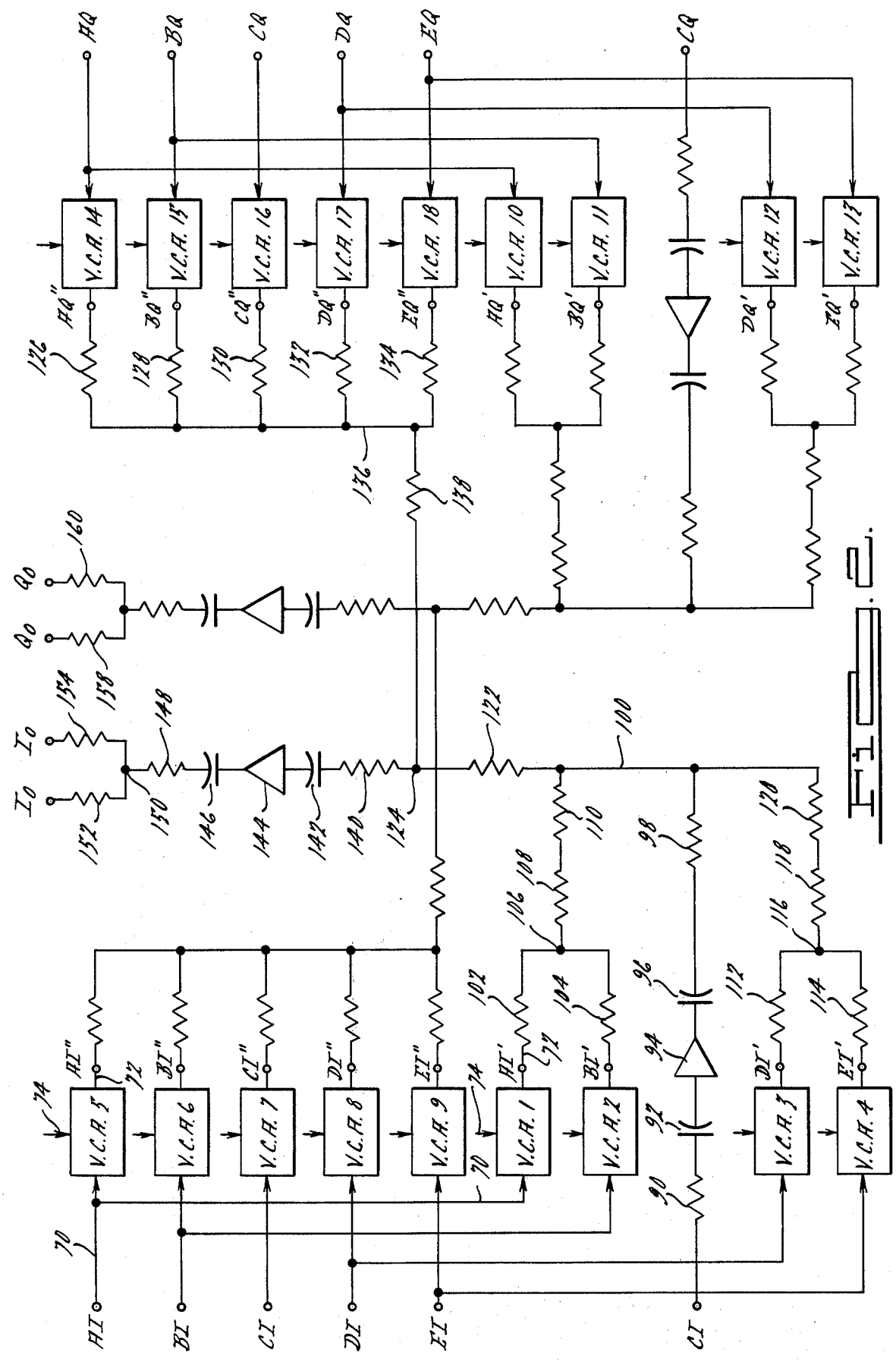

Particular reference is made to FIGS. 1 and 2 that together form a block diagram of an adaptive equalizer particularly suited for use with two channels of binary input digital information having the same data rate. One of the binary data input signals comprises a signal $I_{in}$ and the other a signal $Q_{in}$. These signals may be obtained from a demodulator (not shown) of a quadrature-phase-shift-keyed signal supplied to the demodulator.

The $I_{in}$ binary data signal is supplied to a delay line 10i, and the $Q_{in}$ binary data signal is supplied to an identical delay line 10q. The I-channel delay line includes resistors 12i, 14i, 16i, 18i, 20i, 22i, 24i, 26i, 28i, 30i, 32i, 34i, 36i, 38i, 40i, 42i, 44i, 46i, 48i, 50i, and 52i. The delay line 10i also includes four discrete time delay elements 54i, 56i, 58i, and 60i, which delay elements may provide time delays of, for example, 5 nanoseconds each. The delay line 10i also includes capacitors 62i and 64i and voltage amplifiers 66i and 68i are provided as required to boost signal levels. The Q-channel delay line 10q includes identically numbered components followed by the letter q. The resistors in the I and Q-channel delay lines are included primarily for purposes of providing power division for the various taps provided on either side of the various delay elements.

On the input side of the delay element 54i in the I-channel delay line 10i there are provided two tap terminals identified by the letters AI, which letters also identify the signal appearing at these terminals. This signal has zero time delay. A signal BI appears at two terminals located between the delay elements 54$i$ and 56$i$. The signal CI appears at three terminals, constituting the center tap of the I-channel delay line, located between the delay elements 56$i$ and 58$i$. Also, the signal DI appears at two terminals located between the delay elements 58$i$ and 60$i$ and the signal EI appears at two terminals following the delay element 60$i$. Similar terminals AQ through EQ are provided in connection with the Q-channel delay line 10$q$.

There are a total of 18 VCAs, identified as VCA 1 through VCA 18, in the adaptive equalizer. Each of the VCAs has an input lead 70, an output lead 72 and a control voltage input lead 74. The control voltage input lead 74 is, for each of the VCAs, connected to the output of a D/A converter 76, which has an input 78 obtained from the output of a binary counter 80. The counter 80 has an up-input 82 obtained from the output of a NAND-Gate 84 and has a down-input 86 obtained from the output of a NAND-gate 88. The D/A converters and the counters associated with the respective VCAs are given similar numerical designations, that is, the converters are designated D/A 1 through D/A 18 and the counters are designated counter 1 through counter 18. The inputs to the NAND-gates control whether or not the counters are incremented or decremented and control the times when such increments and decrements occur.

Four of the VCAs have inputs that are fed by the four non-center taps of the I-channel delay line, i.e., taps AI, BI, DI and EI and compensate for intra-channel distortion in the I-channel. Similarly, another four VCAs, supplied with the delay line signals AQ, BQ, DQ and EQ, compensate for Q-channel intra-channel distortion. The center tap signals CI and CQ of the I and Q-channel delay lines, respectively, are fed straight through a preset attenuator to a summing circuit shown in FIG. 2. Five of the VCAs are supplied with the five I-channel taps AI through EI and the outputs of these five VCAs are supplied to the Q-channel summing circuit shown in FIG. 2 to compensate for inter-channel distortion or cross-talk between the channels. Similarly, five VCAs are supplied with the Q-channel tap signals AQ through EQ and have outputs that are supplied to the I-channel summing circuit shown in FIG. 2 to compensate for inter-channel distortion or cross-talk between the channels. In the adaptive equalizer, the center taps of the I and Q-channels, having the signals CI and CQ, respectively, are taken as references and the VCAs have their gains adjusted to compensate for input signal amplitude and delay distortion.

With particular reference to FIG. 2, it may be seen that the I-channel tap signals AI, BI, DI and EI are applied to the input leads 70 of VCAs 1 through 4, respectively. The center tap signal CI is applied, through the series circuit including a resistor 90, a capacitor 92, an amplifier 94, a capacitor 96 and a resistor 98, to a lead 100. The output of VCA 1 is a signal AI' that is applied to a resistor 102. The output of VCA 2 is a signal BI' that is applied to a resistor 104 connected in parallel with the resistor 102. The junction 106 between these resistors is connected through resistors 108 and 110 to the lead 100. Similarly, the output of VCA 3 is a signal DI' and the output of the VCA 4 is a signal EI', these two signals being applied to the parallel combination of resistors 112 and 114 whose junction 116 is coupled through resistors 118 and 120 to the lead 100. Thus, the signals AI', BI', CI, DI', and EI' are summed at lead 100 and coupled through a resistor 122 to a junction 124.

The signals AQ through EQ are applied as the inputs, respectively, to VCAs 14 through 18. The output signals AQ" through EQ" of these VCAs are coupled, respectively, through resistors 126, 128, 130, 132, and 134 to a lead 136, and lead 136 of this summing circuit is coupled through a resistor 138 to the junction 124. The junction 124 is coupled through a resistor 140, a capacitor 142, and amplifier 144, a capacitor 146 and a resistor 148 to the junction 150 of a power divider comprising resistors 152 and 154 at whose opposite terminals the adaptive equalizer I-channel output signals $I_o$ appear. One of the $I_o$ output terminals is coupled to a quality detector 156 illustrated in FIG. 1 and the other $I_o$ output is available for connection to circuitry external of the adaptive equalizer. VCAs 1 through 4 compensate for intrachannel distortion in the I-channel, with the CI center tap input as a reference, and VCAs 14 through 18 compensate for inter-channel distortion or cross-talk between the I and Q-channels.

Circuitry identical to that just described in connection with FIG. 2 is utilized in connection with the Q-channel to produce the outputs $Q_o$ at the terminals of power divider resistors 158 and 160. One of the $Q_o$ outputs is applied to a quality detector 162 illustrated in FIG. 1 and the other is applied to circuitry external of the adaptive equalizer. VCAs 10 through 13, together with center tap reference input CQ, compensate for intra-channel distortion in the Q-channel and VCAs 5 through 9 compensate for intra-channel or cross-talk between the I and Q-channels.

It will be apparent to one of ordinary skill in the data transmission art that the I and Q-channel output signals $I_o$ and $Q_o$ have a character or quality that is determined by the gains of the various VCAs. The manner in which the voltages applied to the control voltage inputs of the various VCAs are adjusted to control their gains is discussed in the paragraphs which follow.

In FIG. 1, it may be seen that the delay line tap signals AI through EI and AQ through EQ form the inputs to a sequential switch 164. The sequential switch has an output lead 166 that is sequentially coupled to the I and Q-channel delay line tap signal inputs. A fixed attenuator 168 may be provided in the output 166. The equalizer circuit includes a master clock 170 which feeds pulses to a ten-phase generator 172. The ten-phase signal generator produces output pulses $\phi 1$ through $\phi 10$, and their complements, which are ten pulsating signals of identical frequency but differing in phase from one another. This generates ten time-slots that are used to control the sequential switch 164 and the steering logic formed by the NAND-gates 84 and 88 associated with each of the counters 1 through 18. During the time-slot $\phi 1$, the I-channel delay line tap input AI is coupled to the sequential switch output lead 166. During the time-slot $\phi 2$, the BI tap input is coupled to the sequential switch output 166 and so on with respect to the ten delay line tap inputs to the sequential switch.

Let it be assumed that during the time-slot, $\phi 1$, the I-channel delay line tap signal AI is coupled to the sequential switch output lead 166. Thus, the signal AI is applied via a lead 174 to the quality detector 156 and via a lead 176 to the quality detector 162. The quality detector 156 also receives the adaptive equalizer I-channel output signal $I_o$. The quality detector 156 combines the tap signal AI, both in-phase and out-of phase, with the $I_o$ output signal. The signal resulting from the in-phase combination of the $I_o$ and AI signals is passed through a full-wave rectifier. The resulting signal then is passed through a high-pass filter in the quality detector and the output of the high-pass filter is fully rectified to produce a signal that is applied to the positive input of a differential amplifier 178. Similarly, the signal produced by the out-of-phase combination of the adaptive equalizer output signal $I_o$ and the tap signal AI is passed through a full-wave rectifier, a high-pass filter and the filter output signal is fully rectified to produce a signal that is applied to the negative input of the differential amplifier 178. The amplifier 178 amplifies the difference between the two signals applied to its inputs to produce a signal on its output lead 180 indicative of the quality of the adaptive equalizer output signal $I_o$. The quality of this $I_o$ output signal is determined primarily by its squareness.

In the quality detector 156 and with respect to the in-phase combination of the $I_o$ output signal and the tap signal AI, the full-wave rectification of these signals produces a DC level which is indicative of the squareness of the $I_o$ output waveform. If the $I_o$ output signal is a perfect squarewave, the DC level of the rectifier output will be zero. However, if the signal is not a perfect squarewave, the output of the first full-wave rectifier has an AC component which is transferred through the high-pass filter to the second full-wave rectifier. The output of this second rectifier then is a voltage having an amplitude inversely proportional to the quality (squareness) of the signal resulting from the in-phase combination of the signals $I_o$ and AI. Similar remarks apply to the function of the quality detector in connection with the processing therein of the out-of-phase combination of the signals $I_o$ and AI. Thus, if the in-phase combination of signals $I_o$ and AI has a higher quality (squareness) than their out-of-phase combination, the output of the differential amplifier is positive indicating that the contribution of AI to $I_o$ should be increased. If the out-of-phase combination shows a higher quality, the differential amplifier output is negative indicating that the contribution of AI to $I_o$ should be decreased.

It should be noted that the time-slots $\phi 1$ through $\phi 10$ are long in comparison with the data rate of the signals $I_{in}$ and $Q_{in}$. This permits the quality detectors 156 and 162, which operate in a similar manner, to monitor their input signals over a number of data bit intervals.

The signal appearing at the output lead 180 of the differential amplifier 178 is applied as the input to an integrator 182 which, over the period of the time-slot $\phi 1$ in the example herein discussed, integrates the quality signal appearing on lead 180 over the $\phi 1$ time-slot before it is reset by a signal appearing on line 184 coupled to the master clock 170. The signal appearing at the output 186 of the integrator is applied to a threshold detector. If the signal exceeds a predetermined magnitude, a logic one level signal appears at either the up-output 188 of the threshold detector or at its down-output 190. Whether the logic one level signal appears on the up- or down-output depends upon the polarity of the voltage level signal appearing on the input 186 to the threshold detector.

The Q-channel output signal $Q_o$ and the AI tap signal supplied to the quality detector 162 during the $\phi 1$ time-slot are combined in this quality detector and the combined signals are rectified, passed through high-wave filters and again rectified to supply signals to a differential amplifier 192 that has an output 194 supplied to an integrator 196. Integrator 196 has an output 198 that is supplied to a threshold detector 200. The threshold detector has logic level output leads 202 and 204.

Let it be supposed that just prior to the $\phi 1$ time-slot, the up-output lead 188 of the threshold detector 187 has a logic one level signal on it and this signal is applied via a lead 188 to one of the inputs to the NAND-gate 84 associated with counter 1. The other input to this NAND-gate is the $\phi 1$ pulse produced by the ten-phase signal generator 172 and, therefore, output lead 82 of the NAND-gate 84 associated with counter 1 is at a low logic level. At the end of the $\phi 1$ time-slot, the signal on this NAND-gate output lead changes from a logic zero level to a logic one level, a positive-going edge which increments the counter one. This increases the voltage output of D/A 1 and increases the voltage applied to the voltage control input 74 of VCA 1. If the down-output lead 190 of the threshold detector 187 were at a logic one level just before termination of the $\phi 1$ time-slot, rather than the logic one level being on the lead 188 as previously described, then the NAND-gate associated with counter 1 would have this logic one level signal applied to one of its inputs via a lead 190 causing, at the end of the $\phi 1$ time-slot, the counter 1 to be decremented. Similarly, logic one levels appearing on either of the up- or down-output leads 202 and 204 of the threshold detector 200 just prior to the end of the $\phi 1$ time-slot would cause, at the end of this time-slot, the counter 5 to be either incremented or decremented.

During time-slot $\phi 2$, counters 2 and 6 are either incremented or decremented depending upon the signal appearing on one of the outputs of each of the threshold detectors 187 and 200. At the end of time-slot $\phi 3$, only counter 7 is incremented or decremented. At the end of time-slot $\phi 4$, counters 3 and 8 are incremented or decremented. At the end of time-slot $\phi 5$, counters 4 and 9 are incremented or decremented. At the end of time-slot $\phi 6$, counters 14 and 10 are incremented or decremented. At the end of time-slot $\phi 7$, counters 15 and 11 are incremented or decremented. At the end of time-slot $\phi 8$ only counter 16 is incremented or decremented. At the end of time-slot $\phi 9$ counters 17 and 12 are incremented or decremented, and at the end of time-slot $\phi 10$ counters 18 and 13 are incremented or decremented.

At the end of time-slot $\phi 10$ the time-slot $\phi 1$ again begins and the process is repeated so that the counters are sequentially incremented or decremented to change the various voltages applied to the voltage control inputs of the 18 VCAs. The criterion for incrementing or decrementing the counters is the squareness of signals applied to the quality detectors 156 and 162 and the system operates in a closed-loop manner to adjust adaptively the equalizer outputs $I_o$ and $Q_o$ to improve the quality of these signals.

Figure 3:
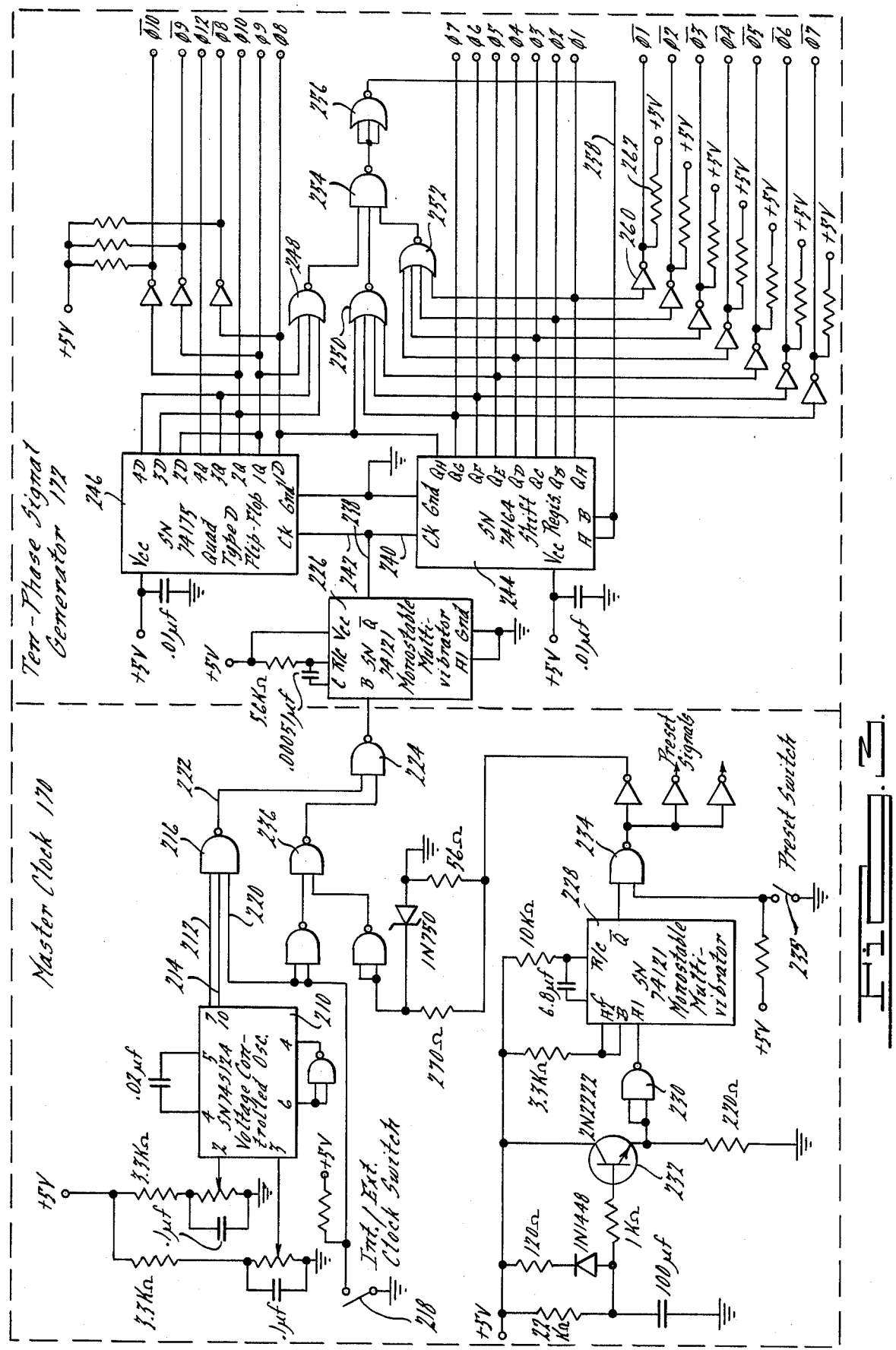
FIG. 3 is a schematic electrical diagram of a master clock and ten-phase signal generator illustrated in block form in FIG. 1.

With particular reference now to FIG. 3, there is shown a schematic electrical diagram of the master clock 170 and the associated ten-phase signal generator 172. The master clock circuit 170 includes a voltage controlled oscillator 210 having associated elements for producing pulse signals on its output leads 212 and 214. These outputs form two of the inputs to a NAND-gate 216 that has a third input obtained from an internal/external clock switch 218. Normally, the switch 218 is open as shown to provide internal clock operation based on the oscillator 210. In this case, a logic one level signal is applied to the third input lead 220 of the NAND-gate 216 so that an oscillating signal occurs on its output lead 222. This is gated through a NAND-gate 224 to the set input of a monostable multivibrator 226 in the ten-phase signal generator 172.

The master clock 170 also includes a monostable multivibrator 228 having an input obtained from the output of a NAND-gate 230 whose input is connected to the emitter of a transistor 232. The resistors and capacitors associated with the transistor 232 cause it to be rendered alternately conductive and nonconductive to supply pulses to the pin 3 input of the multivibrator 228. As a result, oscillating signals are produced at the output of a NAND-gate 234 provided that a normally-closed preset switch 235 is in the open condition illustrated. When the switch 218 is in the position illustrated, the pulses produced at the output of the NAND-gate 234 have no effect. However, when the switch 218 is closed, the lead 222 is maintained at a logic one level and a NAND-gate 236 allows the pulses produced at the output of the NAND-gate 234 to be passed to the input of the NAND-gate 224. This sets NAND-gate 224. The output of NAND-gate 234 is used to preset various components, as required, in the circuitry hereinafter described.

The output 238 of the multivibrator 226 is applied via a lead 240 to the clock input of an eight-bit parallel-out serial shifter register 224 and via a lead 242 to the clock input of a quadruple type-D flip-flop 246. The shift register and flip-flop, in conjunction with NOR-gates 248, 250 and 252 and in conjunction with NAND-gate 254 and invertor 256, provide ten-phase, identical frequency timing-slot signals $\phi 1$ through $\phi 10$ on the leads so designated. Invertors 260 and resistors 262, coupled to the $\phi 1$ through $\phi 10$ leads, produce the complements of the timing-slot signals, that is, signals $\overline{\phi 1}$ through $\overline{\phi 10}$ on the leads so designated.

Figure 4:
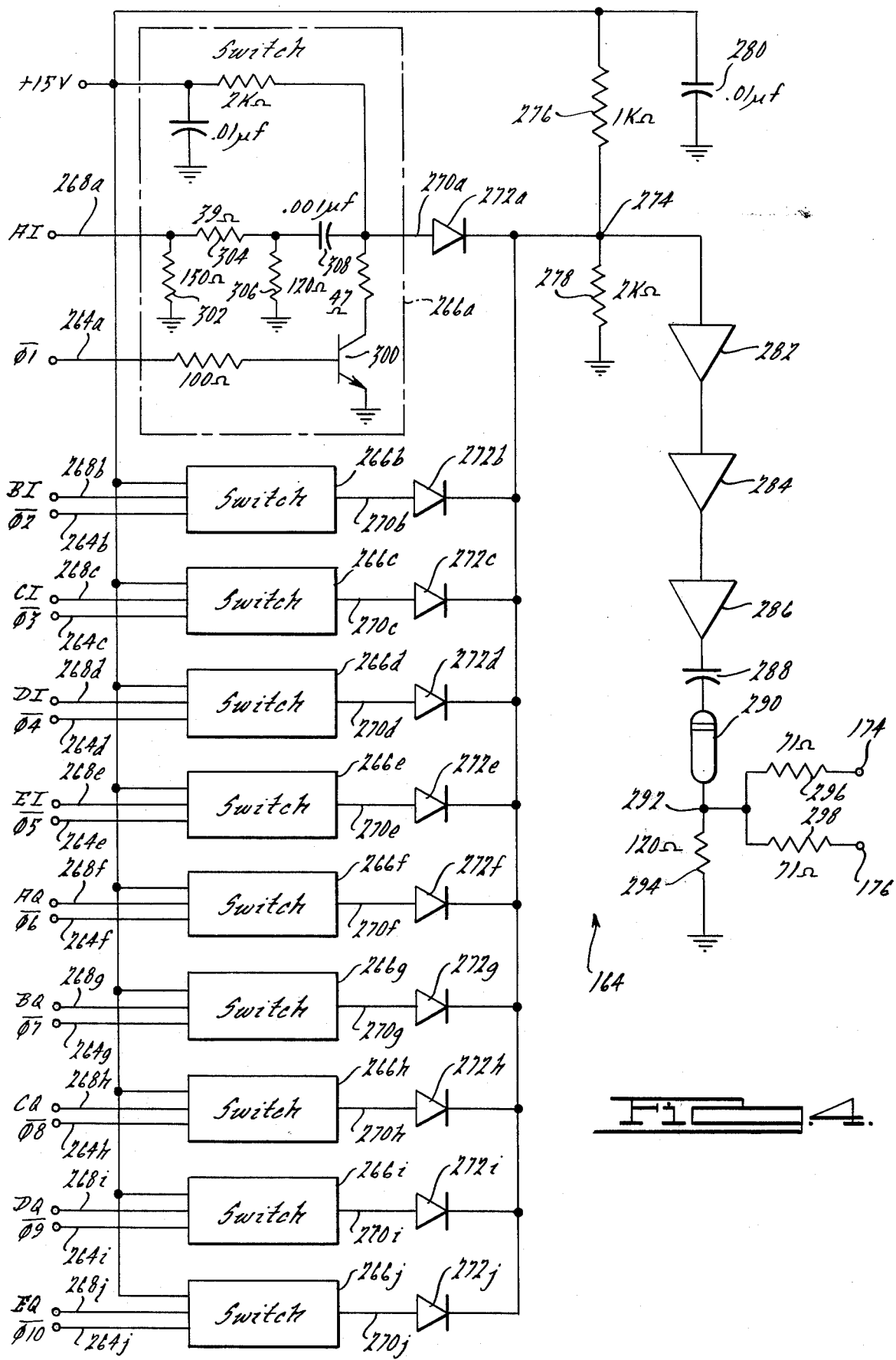
FIG. 4 is a schematic electrical diagram of a sequential switch illustrated in block form in FIG. 1.

With particular reference now to FIG. 4, there is shown the sequential switch 164 that is illustrated in block form in FIG. 1. The circuit 164 has ten input leads 264a through 264j to which the complementary timing-slot impulses $\overline{\phi 1}$ through $\overline{\phi 10}$ are applied, respectively. The $\overline{\phi 1}$ $\overline{\phi 10}$ signals are applied, respectively, to electronic switches 266a through 266j, only one of these electronic switches being illustrated in detail. The electronic switches 266 have input signal leads 268a through 268e to which the I-channel delay line tap signals AI through EI are applied, respectively, and have output leads 270a through 270e. The electronic switches 266f through 266j have input leads 268f through 268j to which the Q-channel delay line tap signals AQ through EQ, respectively, are applied and have switch output leads 270f through 270j.

The switch output leads 270a through 270j are coupled, respectively, to the anodes of blocking diodes 272a through 272j and the cathodes of these blocking diodes are connected to a junction 274 formed between resistors 276 and 278 which form a voltage divider between a 15-volt DC supply voltage and ground. A capacitor 280 is connected across the voltage supply source. Junction 274 is connected, through a series circuit including a plurality of amplifier 282, 284 and 286, a capacitor 288 and a fixed delay line 290 used for delay compensation to a junction 292. A resistor 294 is connected between the junction 292 and ground. Resistors 296 and 298 form a power divider for the various delay line tap signals AI through EI and AQ through EQ which appear at junction 292 sequentially as the complementary time-slot pulses $\overline{\phi 1}$ through $\overline{\phi 10}$ occur. Leads 174 and 176 are inputs, respectively, to the quality detectors 156 and 162.

With respect to the operation of the electronic switches 266, consider the switch 266a which has as its tap signal input the signal AI and at its input 264a the time-slot signal $\phi 1$ which is for most of its period at a logic one level (high voltage) and for a small part of its period at a logic zero level (substantially ground potential). During the logic one level of $\overline{\phi 1}$, a transistor 300 has it collector-emitter output circuit maintained in a conductive state essentially connecting the switch output lead 270a to ground potential. During those portions of the $\overline{\phi 1}$ period during which lead 264a is at a logic zero level, the transistor 300 is nonconductive and the AI tap signal input on lead 268a is passed through the filter circuitry including resistors 302, 304 and 306 and capacitor 308 and through the blocking diode 272a, to the junction 274. Thus, during the $\overline{\phi 1}$ time-slot, the portion of the $\phi 1$ signal during which lead 264a is at a logic zero level, a signal appears at junction 274 that is essentially the tap signal AI, and this signal is passed through the amplifiers 282, 284 and 286 and the capacitor 288 and the delay element 290 and appears on leads 174 and 176.

Figure 5:
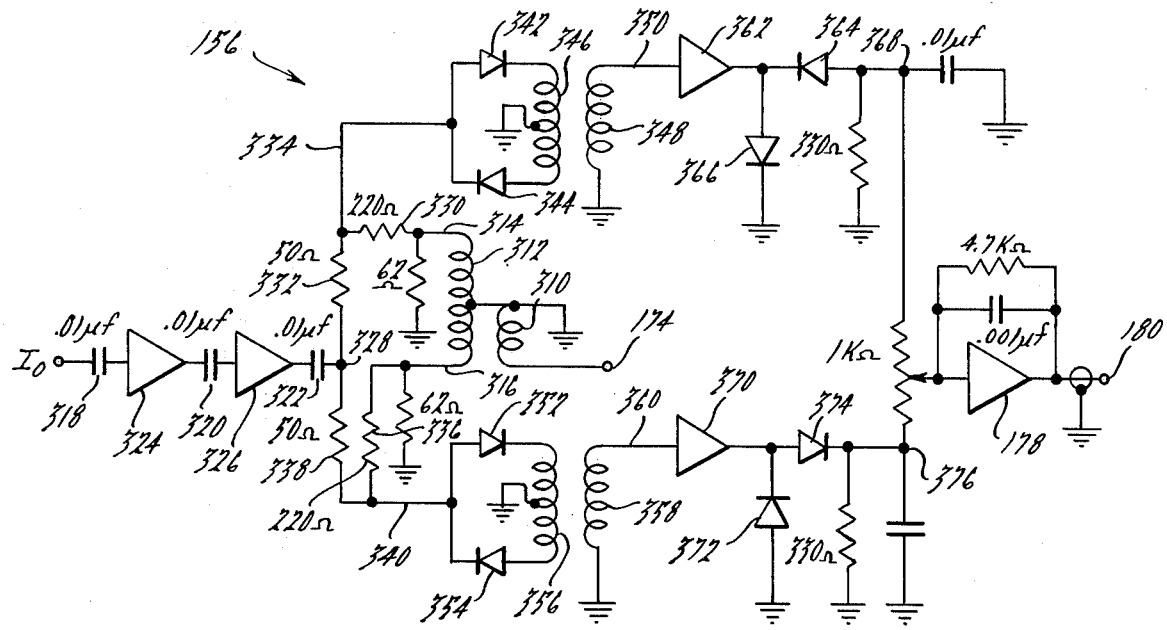
FIG. 5 is a schematic electrical diagram of a quality detector, two of which are illustrated in block form in FIG. 1.

With particular reference now to FIG. 5, there is shown the I-channel quality detector 156, but it should be understood that the Q-channel quality detector 162 is identical. The tap sample signal appearing on lead 174 of the sequential switch is applied to lead 174 illustrated in FIG. 5, which is connected to the primary winding 310 of a transformer having a secondary winding 312 with a grounded center tap connected to one end of the primary winding is 180° out of phase with the signal appearing on the lead 316.

The $I_o$ adaptive equalizer output signal is applied, through blocking capacitors 318, 320 and 322 and through amplifiers 324 and 326, to a junction 328. The tap signal on lead 314, hereinafter referred to as the in-phase tap signal, causes a current to flow through a resistor 330 and the $I_o$ signal appearing at junction 328 causes a current to flow through a resistor 332, these currents being combined at lead 334 to produce an in-phase combination of the tap signal and the $I_o$ adaptive equalizer output signal. Similarly, currents flow through resistors 336 and 338 to produce an out-of-phase combination of these signals at lead 340. The signal at lead 334 is passed through a full-wave rectifier formed by diodes 342 and 344 and the primary winding 346, having a center tap ground, of a transformer having a secondary winding 348. The transformer acts as a high-pass filter so that the signal on lead 350 is an AC signal.

The out-of-phase combination of the tap signal appearing at lead 174 and the adaptive equalizer output signal $I_o$ appears on lead 340 and is passed through the full-wave rectifier including the diodes 352 and 354 and transformer primary winding 356. The signal appearing on lead 360 of the transformer secondary winding 358 is an AC signal.

The AC signal on lead 350 is amplified by an amplifier 362 and the amplified AC signal is fully rectified by diodes 364 and 366 to provide at a junction 368 a DC voltage level representing the amplitude of the AC signal appearing at lead 350. Similarly, amplifier 370 and diodes 372 and 374 amplify and fully rectify the AC signal appearing on lead 360 to produce a DC voltage level at junction 376 representing the amplitude of the AC signal appearing on lead 360. The differential amplifier 178 produces on its output lead 180 a signal representing the difference between the DC levels at junctions 368 and 376.

Figure 6:
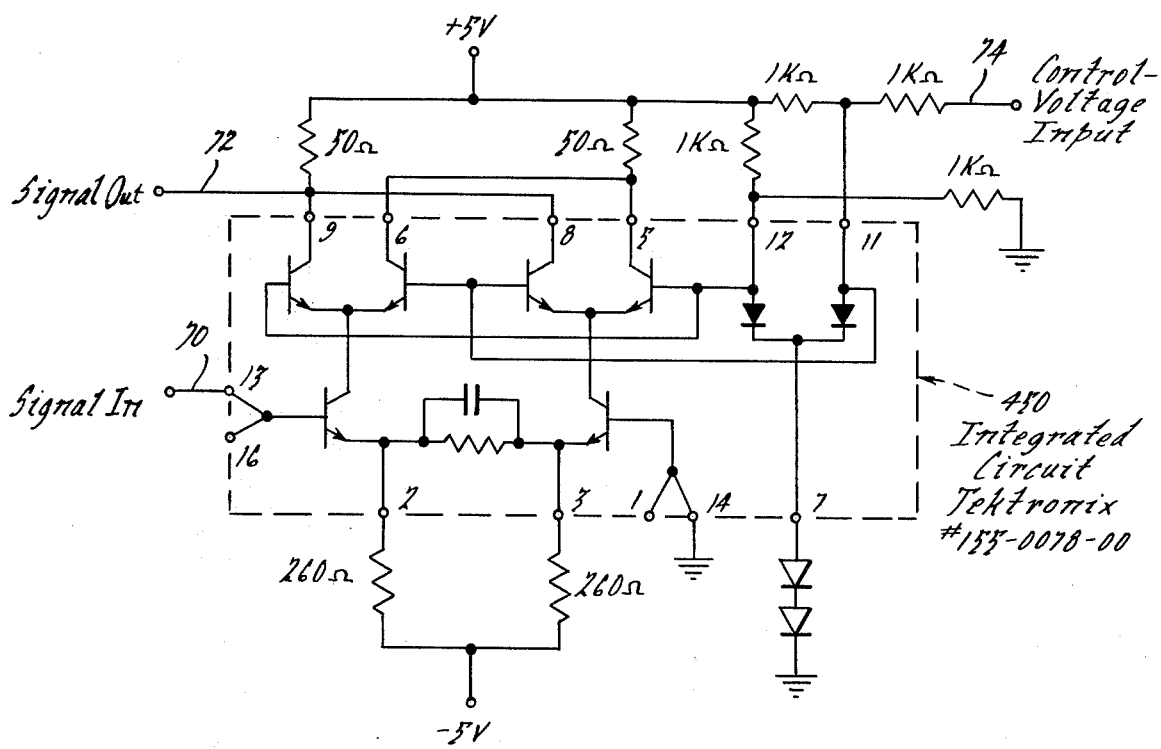
FIG. 6 is a schematic electrical diagram of an integrating circuit and a threshold detector illustrated in block form in FIG. 1.

FIG. 6 illustrates the I-channel integrating circuit 182 and threshold detector 187. The input to the integrating circuit is the signal appearing on lead 180 and is applied, through a unity gain inverting amplifier 378 and a resistor 380, to the integrate input (INT) of a type 9028 integrator commercially available from Optical Electronics, Inc. The integrator 382 has an output lead 384, a reset input R, an operate input O and an initial condition input IC that is connected through a resistor 386 to the signal input lead 180. A capacitor 388 is connected between the output lead 384 and the integrator input SJ to increase the time constant of the integrator 382.

A clock signal is applied to an input lead 390 of a monostable multivibrator 392. The clock signal has the same frequency as do the time-slot signals $\phi 1$ through $\phi 10$ and may be obtained by connection of the lead 390 to the lead 238 of FIG. 3. The Q-output of the multivibrator 392 is connected to the reset input of the integrator 382 and its $\overline{Q}$-output is connected to the operate input O of the integrator. Thus, upon the occurrence of a pulse upon the lead 390, the integrator is reset and then caused to operate to integrate the signal appearing at the integrator INT input and to sum the integrated signal with the initial condition input supplied through the resistor 386. Thus, the signal appearing on output lead 384 is a function of the initial condition input plus the result of the integration of the signal appearing on lead 180 over a time interval determined by the length of the particular time-slot involved.

The signal on lead 384 is applied through a resistor 394 to the negative input of an inverting amplifier 396. This amplifer also is supplied at its negative input, through a resistor 397, with the signal appearing on lead 180, this signal being summed with the integrator output signal. Since the integrator 382 produces a polarity inversion during its operation, the signal applied to the amplifier 396 through the resistor 397 cancels the inverted initial condition input to the integrator 382 so that the signal on output lead 398 of the amplifier 396 is a voltage which represents the integral of the signal on lead 180 over each of the $\phi 1$ through $\phi 10$ time slot intervals.

A reference negative DC voltage is produced at a junction 400 and a corresponding magnitude and positive DC voltage is established at a junction 402. Between the junctions 402 and 400, fixed resistors 404 and 406 and variable resistor 408 form a voltage divider that produces a negative voltage on a lead 410 that is a predetermined amount below ground potential and a positive voltage on a lead 412 that is a corresponding predetermined level above ground potential. This establishes a negative threshold level on an output lead 414 of a voltage follower 416 and a positive threshold level on an output lead 418 of a voltage follower 420. The negative threshold level on lead 414 is applied through an input resistor 422 to the positive input of a comparator 424, and the positive threshold level on lead 418 is applied through an input resistor 426 to the negative input of a comparator 428. The signal on lead 398 is applied through a resistor 430 to the negative input of the comparator 424 and through a resistor 432 to the positive input of the comparator 428.

If the signal 398 has a magnitude which exceeds the polarity of the negative threshold voltage applied to the positive input of the comparator 424 and if it has a negative polarity, then the comparator 424 produces on its output lead 190 a logic one level signal that indicates and cause a countdown or decrement in one of the counters 1 through 15, the particular counter being decremented being determined by the time-slot during which the integrating circuit 182 produced the signal on lead 398. On the other hand, if the signal 398 has a positive polarity which exceeds the positive threshold level established at the negative input of the comparator 428, then a logic one level signal appears on output lead 188 of the comparator 428 causing one of the counters 1 through 15 to be counted up or incremented. During each of sequentially occurring time-slots $\phi 1$ through $\phi 10$, an integration is carried out by the integrator 382, and if the magnitudes of the threshold voltage levels are exceeded during a time-slot, a count up or countdown signal appears on either lead 436 or lead 434.

With particular reference now to FIG. 7, there is shown a detailed schematic diagram of NAND-gates 84 and 88 comprising steering logic for the count-up and count-down signals appearing on leads 188 and 190, respectively, and illustrating a counter 80 and a D/A converter 76 which on its output lead 74, produces voltage signals for controlling the gain of a VCA. This circuitry has been described in considerable detail in connection with FIG. 1, but it should be noted that the NAND-gates 84 and 88 may have an inhibit input 438 designed to prevent count-up or count-down signals from passing into the counter 80.

The counter 80 is comprised of two commercially-available synchronous four-bit up/down counters 440 and 442 having output leads 78, six in number to provide six bits of binary number information, that are supplied to a commercially available D/A converter 444. The D/A converter 444 has an output that is applied to a differential amplifier 446 having the output lead 74. A NAND-gate 448 inhibits the NAND-gate 84, preventing further up-counting of the counters 440 and 442, when the signals on the leads 78 have all become logic one level signals.

In FIG. 8, there is shown a preferred form of a VCA. The VCA includes a commercially-available integrated circuit 450 and a resistor network to which the control input voltage on lead 74 is applied and to which DC voltage supplies are connected. The input signal appearing on lead 70 is amplified or attenuated in a manner determined by the magnitude of the control voltage input to produce the signal appearing on output lead 72.

The delay lines described in this specification may be of the conventional type or may be formed by linear signal processors such as filters. The operation of the adaptive equalizer is independent of input signal level and the tap weighting factors are adjusted to optimize the squareness of the equalizer output signals. Also, the center tap signals from the delay lines pass straight through to the summing circuitry, thereby, to preserve the center tap signal low frequency components. Also, the adaptive equalizer is advantageous in that its operating is independent of the data detector or demodulator which typically would be used to receive a transmitted signal containing digital data. In the form described in detail herein, the adaptive equalizer compensates for amplitude and delay distortion between, and for intrasymbol interference within each of, two channels of digital data obtained, for example, from a demodulator of a transmitted quadrature-phase-shift-keyed signal received by the demodulator.

Based upon the foregoing description of the invention, what is claimed is:

1. An adaptive equalizer for improving the quality of digital data contained in an electrical input signal adapted to be supplied to said equalizer, said equalizer compensating for amplitude and delay distortion affecting the quality of the digital data contained in said electrical input signal and said equalizer comprising:
   a. a delay line, said delay line being adapted to be supplied with said electrical input signal, said delay line including a plurality of discrete time delay elements and a plurality of taps coupled to said time delay elements;
   b. means for generating a plurality of electrical clock signals of identical frequency but different phase;
   c. sequential switch means, coupled to said plurality of delay line taps, controlled by said clock signals, and having an output, for sequentially coupling said sequential switch means output to said delay line taps, thereby, to generate sequential-switch-means output signals;
   d. a plurality of voltage controlled amplifiers, each of said voltage controlled amplifiers having an input coupled to one of said delay line taps, an output and a control-voltage input;
   e. a plurality of binary number counters, one of said counters being provided for each of said voltage controlled amplifiers;
   f. circuit means for converting binary number counts in said counters to analog voltage respectively proportional to such binary number counts, said analog voltages being coupled to said control-voltage inputs of said voltage controlled amplifiers for which the respectively corresponding counters are provided, the gains of said voltage controlled amplifiers being functions of said analog voltages;
   g. circuit means for summing signals appearing at said outputs of said voltage controlled amplifiers, thereby, to produce an adaptive equalizer output;
   h. a quality detector circuit, coupled to said adaptive equalizer output, said quality detector circuit generating a sequence of quality detector output signals that vary as a function of the departure of the signal at said adaptive equalizer output from a rectangular waveform; and
   i. logic circuit means for sequentially incrementing or decrementing said counters in response to said sequence of quality detector output signals, whereby, the gains of said voltage controlled amplifiers are sequentially altered in an adaptive or closed-loop manner to reduce the departure of the signal at said adaptive equalizer output from a rectangular waveform.

2. An adaptive equalizer according to claim 1: wherein said quality detector circuit comprises circuit means for combining said adaptive equalizer output signal with a signal appearing at said sequential switch output to produce first and second quality detector signals, one of said signals representing the in-phase combination of said adaptive-equalizer-output and sequential-switch-means-output signals and the other of said quality detector signals representing the out-of-phase combination of said adaptive-equalizer-output and sequential-switch-means-output signals, circuit means for rectifying and for removing DC components of said first and second quality detector signals, and circuit means for rectifying the two signals resulting from said rectifying and DC component removal, thereby, to produce third and fourth quality detector signals; and, wherein said adaptive equalizer includes circuit means for generating a signal having an amplitude proportional to, and having a polarity determined by, the integral, over predetermined time intervals, of the difference between said third and fourth quality detector signals, and threshold detector circuit means, coupled to said logic circuit means, for generating logic signals for incrementing or decrementing, depending on said polarity, said counters if said amplitude exceeds a predetermined threshold level.

3. An adaptive equalizer for improving the quality of digital data contained in a plurality of electrical input signals adapted to be supplied to said equalizer, said equalizer compensating for amplitude and delay distortion of and for interference between said electrical input signals, which distortion and interference affect the quality of the digital data contained in said electrical input signals, said equalizer comprising:
   a. first and second delay lines, said first line being adapted to be supplied with a first of said electrical input signals, said second delay line being adapted to be supplied with a second of said electrical input signals, said delay lines each including a plurality of discrete time delay elements and a plurality of taps coupled to said time delay elements;
   b. means for generating a pluality of electrical clock signals of identical frequency but different phase;
   c. sequential switch means, coupled to said delay line taps, controlled by said clock signals, and having an output, for sequentially coupling said sequential switch means output to said delay line taps, thereby, to generate sequential-switch-means-output signals;
   d. a plurality of voltage controlled amplifiers, each of said voltage controlled amplifiers, having an input coupled to one of said delay line taps, an output and a control-voltage input;
   e. a plurality of binary number counters, one of said counters being provided for each of said voltage controlled amplifiers;
   f. circuit means for converting binary number counts in said counters to analog voltges respectively proportional to such binary number counts, said analog voltages being coupled to said control-voltage inputs of said voltage controlled amplifiers for which the respectively corresponding counters ae provided, the gains of said voltage controlled amplifiers being functions of said analog voltages;
   g. circuit means for summing the signals appearing at said outputs of said voltage controlled amplifiers, thereby, to produce first and second adaptive equalizer output signals, said first adaptive equalizer output signal containing the digital data of said first electrical input signal supplied to said adaptive equalizer and said second adaptive equalizer output signal containing the digital data of said second electrical input signal supplied to said adaptive equalizer, said summing circuit means producing said first adaptive equalizer output signal by summing signal appearing at the outputs of voltage controlled amplifiers having inputs coupled to taps of both said first and second delay lines and said summing circuit means producing said second adaptive equalizer output signal by summing output signals of voltage controlled amplifiers having inputs coupled to taps of both said first and second delay lines;
   h. first and second quality detector circuits, said first quality detector circuit being coupled to the adaptive equalizer output at which said first adaptive equalizer output signal occurs and said second quality detector circuit being coupled to the adaptive equalizer output at the location at which said second adaptive equalizer output signal occurs, said first and second quality detector circuits each generating a sequence of quality detector output signals that vary as a function of the departure of the signal at said first and second adaptive equalizer outputs from rectangular waveforms; and i. logic circuit means for sequentially incrementing or decrementing said counters in response to said sequences of output signals from said first and second quality detectors, whereby, the gains of said voltage controlled amplifiers are sequentially altered in an adaptive or closed-loop manner to reduce the departure of the signal at said adaptive equalizer output from a rectangular waveform.

4. An adaptive equalizer according to claim 3: wherein each of said quality detector circuits comprises circuit means for combining said adaptive equalizer output signal with a signal appearing at said sequential switch output to produce first and second quality detector signals, one of said signals representing the in-phase combination of said adaptive-equalizer-output and sequential-switch-means-output signals and the other of said quality detector signals representing the out-of-phase combination of said adaptive-equalizer-output and sequential-switch-means-output signals, circuit means for rectifying and for removing DC components of said first and second quality detector signals, and circuit means for rectifying the two signals resulting from said rectifying and DC component removal, thereby, to produce third and fourth quality detector signals; and wherein said adaptive equalizer includes circuit means for generating a signal having an amplitude proportional to, and having a polarity determined by, the integral, over predetermined time intervals, of the difference between said third and fourth quality detector signals, and threshold detector circuit means, coupled to said logic circuit means for generating logic signals for incrementing or decrementing, depending on said polarity, said counters if said amplitude exceeds a predetermined threshold level.

* * * * *